US012632238B2

(12) United States Patent
Dinatale et al.

(10) Patent No.: US 12,632,238 B2
(45) Date of Patent: May 19, 2026

(54) SYSTEM FOR SOFTWARE DOWNLOAD COMPATIBILITY

(71) Applicant: ARRIS Enterprises LLC, Suwanee, GA (US)

(72) Inventors: John F. Dinatale, Pembroke, MA (US); Ching-Ho Cheng, Allston, MA (US); Wei Hung Hui, Milton, MA (US); David W. Padula, East Walpole, MA (US)

(73) Assignee: ARRIS Enterprises LLC, Horsham, PA (US)

( * ) Notice: Subject to any disclaimer, the term of this patent is extended or adjusted under 35 U.S.C. 154(b) by 255 days.

(21) Appl. No.: 18/239,057

(22) Filed: Aug. 28, 2023

(65) Prior Publication Data

US 2024/0403017 A1      Dec. 5, 2024

Related U.S. Application Data

(60) Provisional application No. 63/469,648, filed on May 30, 2023.

(51) Int. Cl.
| | |
|---|---|
| *G06F 8/61* | (2018.01) |
| *H04N 21/658* | (2011.01) |

(52) U.S. Cl.
CPC .......... *G06F 8/63* (2013.01); *H04N 21/6582* (2013.01)

(58) Field of Classification Search
CPC .............................. G06F 8/63; H04N 21/6582
See application file for complete search history.

(56) References Cited

U.S. PATENT DOCUMENTS

| | | | | |
|---|---|---|---|---|
| 8,255,361 | B2 * | 8/2012 | Igouchkine | G06F 8/658 707/646 |
| 9,036,510 | B1 | 5/2015 | Zhou et al. | |
| 11,609,898 | B2 * | 3/2023 | Desai | G06F 16/164 |
| 2004/0215755 | A1 * | 10/2004 | O'Neill | G06F 8/658 717/170 |
| 2008/0052704 | A1 * | 2/2008 | Wysocki | A63F 13/77 717/173 |
| 2013/0137411 | A1 | 5/2013 | Marin | |
| 2015/0067815 | A1 | 3/2015 | Overcash | |
| 2016/0205591 | A1 | 7/2016 | Hong et al. | |
| 2021/0397600 | A1 * | 12/2021 | Desai | H04L 9/0643 |
| 2022/0116274 | A1 * | 4/2022 | Ye | G06F 8/654 |
| 2022/0385988 | A1 * | 12/2022 | DiNatale | G06F 8/63 |
| 2024/0224030 | A1 * | 7/2024 | Bhaskar | H04W 88/085 |

* cited by examiner

*Primary Examiner* — Marina Lee
(74) *Attorney, Agent, or Firm* — Chernoff, Vilhauer, McClung & Stenzel, LLP

(57) ABSTRACT

A system for software download compatibility.

10 Claims, 7 Drawing Sheets

300 — MANAGEMENT PLANE

310 — CONTROL PLANE

320 — DATA PLANE

330 — SWITCH FABRIC

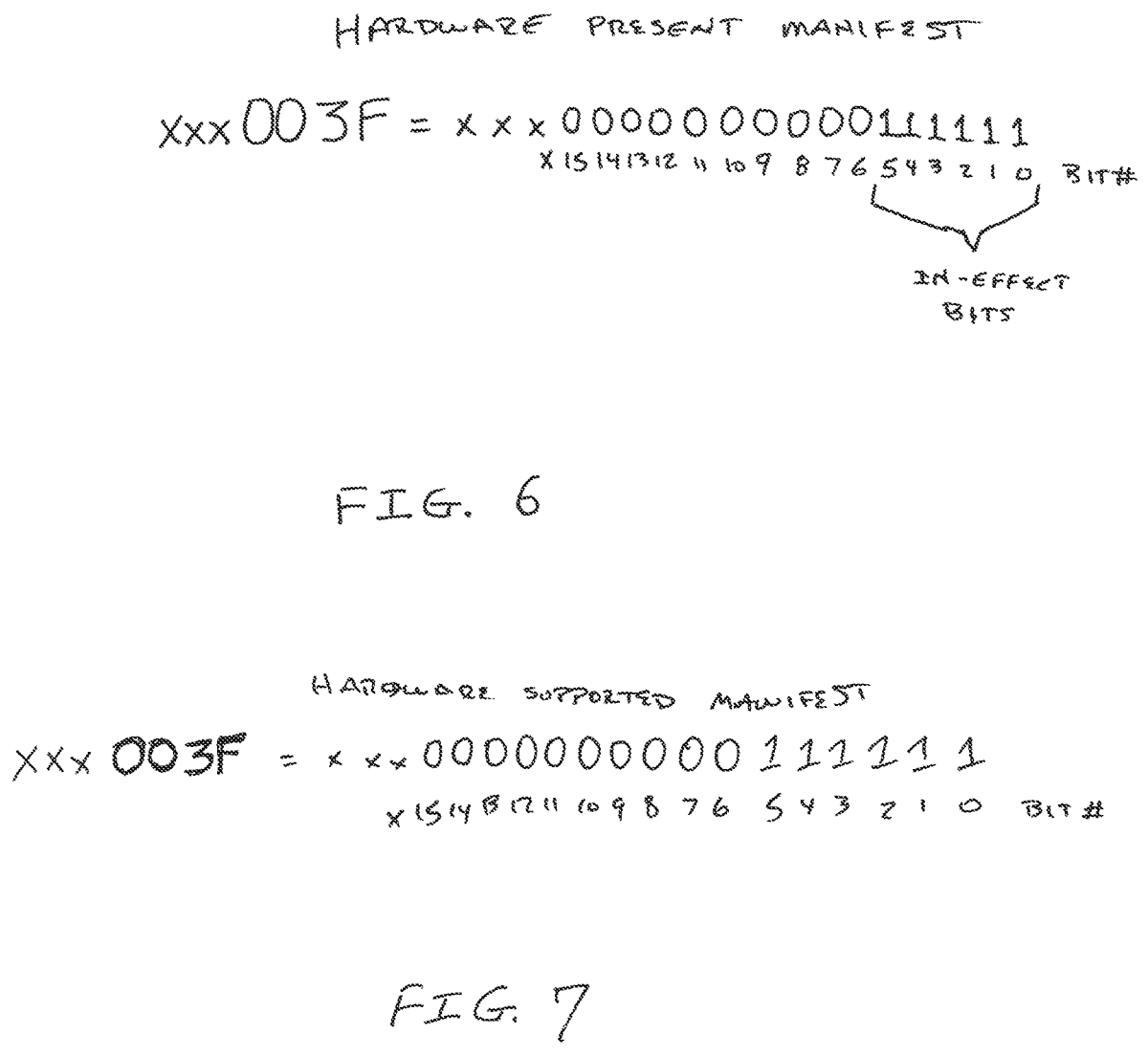

HARDWARE PRESENT MANIFEST

XXX 003F = X X X 0000000000111111
X 15 14 13 12 11 10 9 8 7 6 5 4 3 2 1 0   BIT#

IN-EFFECT
BITS

FIG. 6

HARDWARE SUPPORTED MANIFEST

XXX 003F = X X X 0000000000 111111
X 15 14 13 12 11 10 9 8 7 6 5 4 3 2 1 0   BIT#

FIG. 7

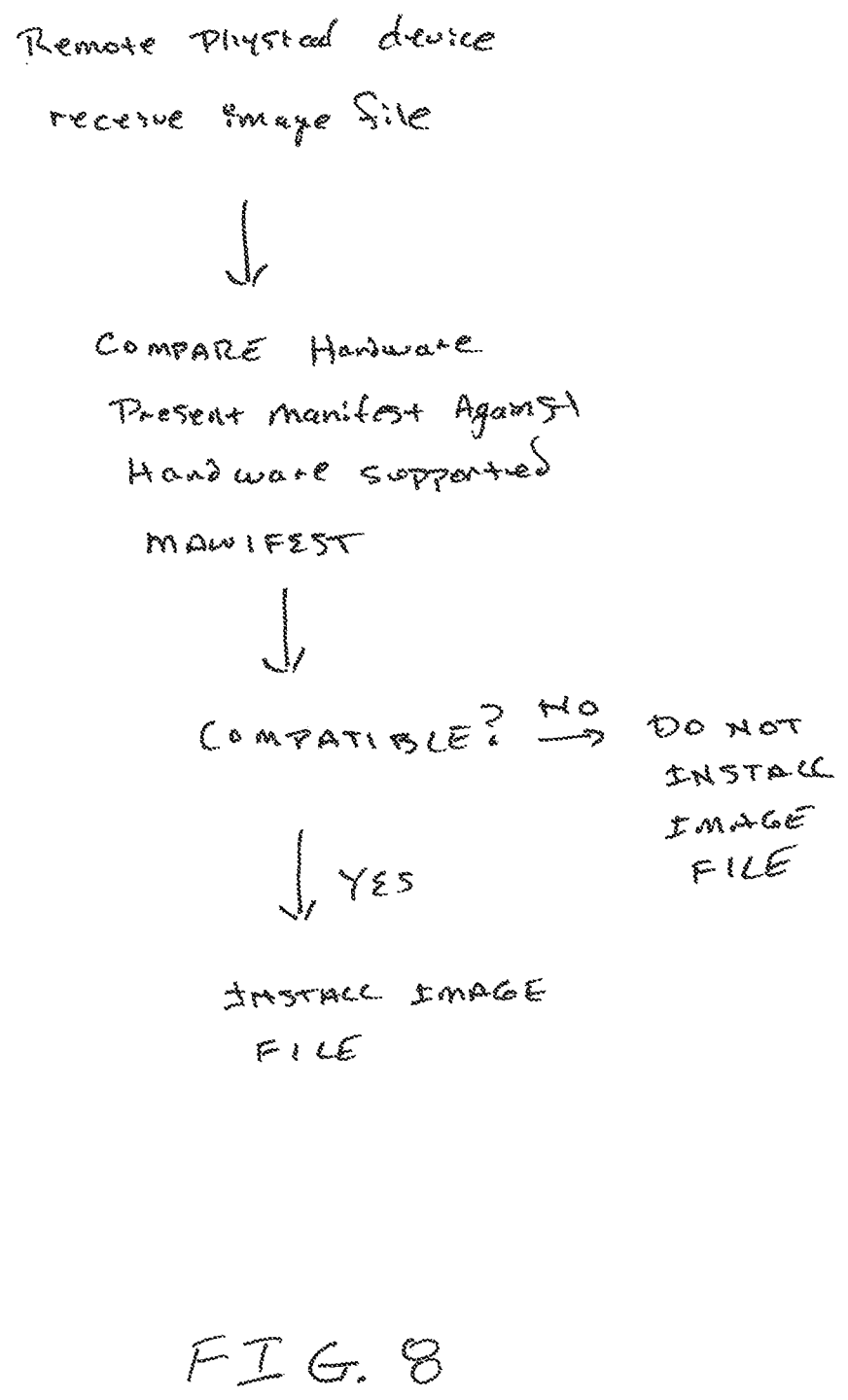

Remote Physical device
receive image file

↓

Compare Hardware
Present manifest Against
Hardware supported
MANIFEST

↓

COMPATIBLE? —NO→ DO NOT
INSTALL
IMAGE
FILE

↓ YES

INSTALL IMAGE
FILE

FIG. 8

SYSTEM FOR SOFTWARE DOWNLOAD COMPATIBILITY

CROSS REFERENCE TO RELATED APPLICATIONS

This application claims the benefit of U.S. Provisional Patent Application Ser. No. 63/469,648 filed May 30, 2023.

BACKGROUND

The subject matter of this application relates to a system for software download compatibility.

Cable Television (CATV) services provide content to large groups of customers (e.g., subscribers) from a central delivery unit, generally referred to as a "head end," which distributes channels of content to its customers from this central delivery unit through an access network comprising a hybrid fiber coax (HFC) cable plant, including associated components (nodes, amplifiers and taps). Modern Cable Television (CATV) service networks, however, not only provide media content such as television channels and music channels to a customer, but also provide a host of digital communication services such as Internet Service, Video-on-Demand, telephone service such as VoIP, home automation/ security, and so forth. These digital communication services, in turn, require not only communication in a downstream direction from the head end, through the HFC, typically forming a branch network and to a customer, but also require communication in an upstream direction from a customer to the head end typically through the HFC network.

To this end, CATV head ends have historically included a separate Cable Modem Termination System (CMTS), used to provide high speed data services, such as cable Internet, Voice over Internet Protocol, etc. to cable customers and a video headend system, used to provide video services, such as broadcast video and video on demand (VOD). Typically, a CMTS will include both Ethernet interfaces (or other more traditional high-speed data interfaces) as well as radio frequency (RF) interfaces so that traffic coming from the Internet can be routed (or bridged) through the Ethernet interface, through the CMTS, and then onto the RF interfaces that are connected to the cable company's hybrid fiber coax (HFC) system. Downstream traffic is delivered from the CMTS to a cable modem and/or set top box in a customer's home, while upstream traffic is delivered from a cable modem and/or set top box in a customer's home to the CMTS. The Video Headend System similarly provides video to either a set-top, TV with a video decryption card, or other device capable of demodulating and decrypting the incoming encrypted video services. Many modern CATV systems have combined the functionality of the CMTS with the video delivery system (e.g., EdgeQAM-quadrature amplitude modulation) in a single platform generally referred to an Integrated CMTS (e.g., Integrated Converged Cable Access Platform (CCAP))-video services are prepared and provided to the I-CCAP which then QAM modulates the video onto the appropriate frequencies. Still other modern CATV systems generally referred to as distributed CMTS (e.g., distributed Converged Cable Access Platform) may include a Remote PHY (or R-PHY) which relocates the physical layer (PHY) of a traditional Integrated CCAP by pushing it to the network's fiber nodes (R-MAC PHY relocates both the MAC and the PHY to the network's nodes). Thus, while the core in the CCAP performs the higher layer processing, the R-PHY device in the remote node converts the downstream data sent from the core from digital-to-analog to be transmitted on radio frequency to the cable modems and/or set top boxes, and converts the upstream radio frequency data sent from the cable modems and/or set top boxes from analog-to-digital format to be transmitted optically to the core.

BRIEF DESCRIPTION OF THE DRAWINGS

For a better understanding of the invention, and to show how the same may be carried into effect, reference will now be made, by way of example, to the accompanying drawings, in which:

FIG. 6 illustrates a hardware present manifest.

FIG. 7 illustrates a hardware supported manifest.

FIG. 8 illustrates an image file compatibility comparison technique.

DETAILED DESCRIPTION

Figure 1:
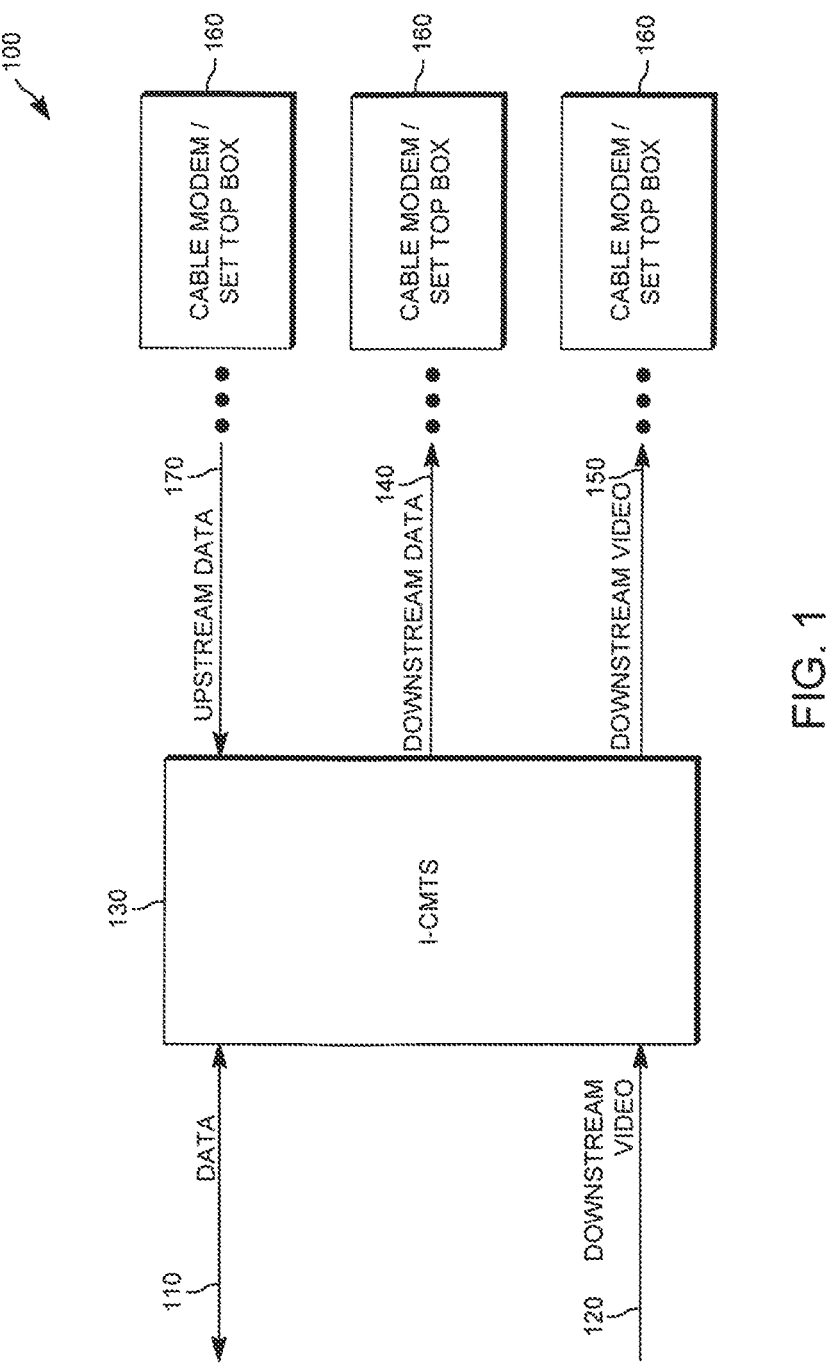
FIG. 1 illustrates an integrated Cable Modem Termination System.

Referring to FIG. 1, an integrated CMTS (e.g., Integrated Converged Cable Access Platform (CCAP)) 100 may include data 110 that is sent and received over the Internet (or other network) typically in the form of packetized data. The integrated CMTS 100 may also receive downstream video 120, typically in the form of packetized data from an operator video aggregation system. By way of example, broadcast video is typically obtained from a satellite delivery system and pre-processed for delivery to the subscriber though the CCAP or video headend system. The integrated CMTS 100 receives and processes the received data 110 and downstream video 120. The CMTS 130 may transmit downstream data 140 and downstream video 150 to a customer's cable modem and/or set top box 160 through a RF distribution network, which may include other devices, such as amplifiers and splitters. The CMTS 130 may receive upstream data 170 from a customer's cable modem and/or set top box 160 through a network, which may include other devices, such as amplifiers and splitters. The CMTS 130 may include multiple devices to achieve its desired capabilities.

Figure 2:
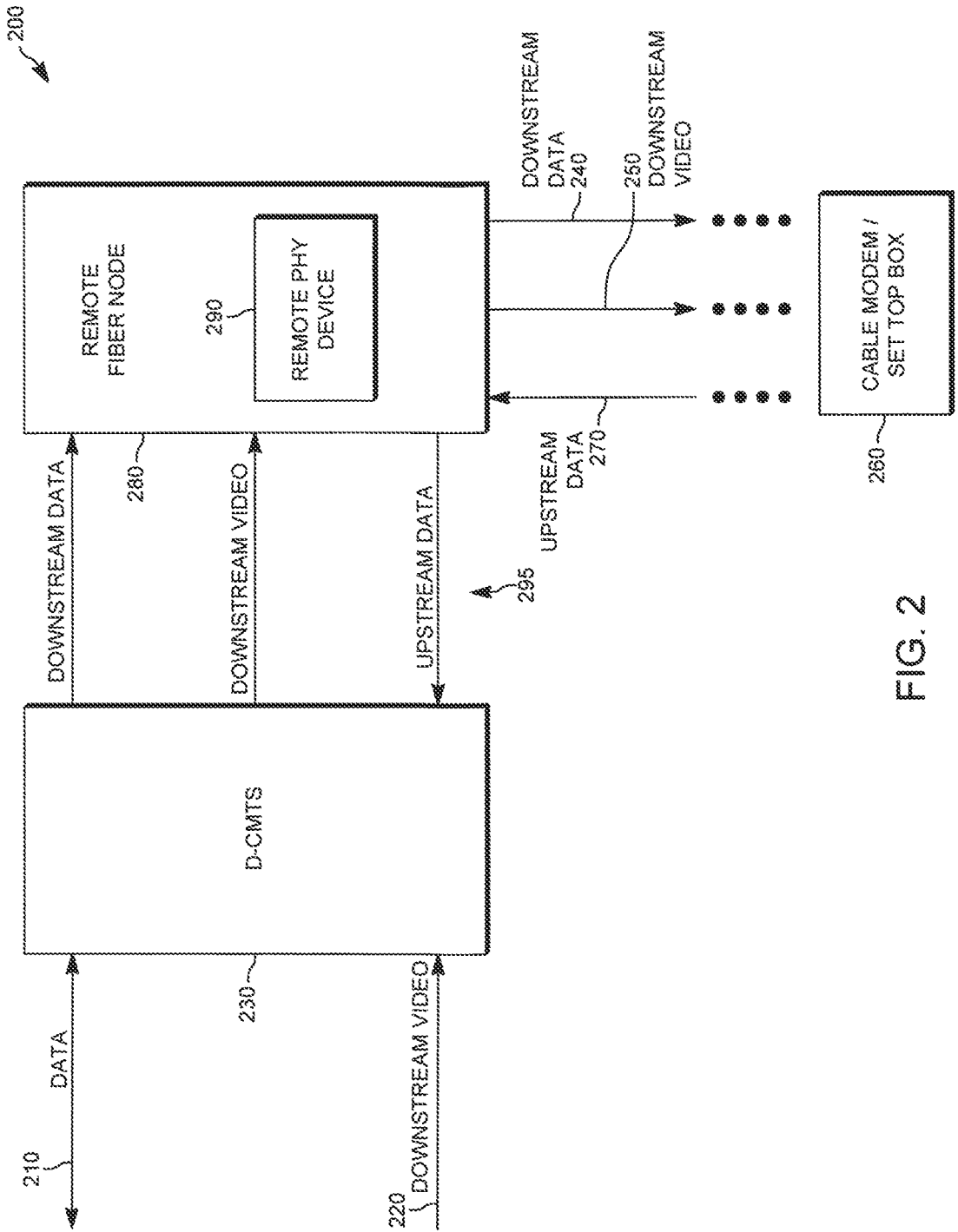
FIG. 2 illustrates a distributed Cable Modem Termination System.

Referring to FIG. 2, as a result of increasing bandwidth demands, limited facility space for integrated CMTSs, and power consumption considerations, it is desirable to include a Distributed Cable Modem Termination System (D-CMTS) 200 (e.g., Distributed Converged Cable Access Platform (CCAP)). In general, the CMTS is focused on data services while the CCAP further includes broadcast video services. The D-CMTS 200 distributes a portion of the functionality of the I-CMTS 100 downstream to a remote location, such as a fiber node, using network packetized data. An exemplary D-CMTS 200 may include a remote PHY architecture, where a remote PHY (R-PHY) is preferably an optical node device that is located at the junction of the fiber and the coaxial. In general, the R-PHY often includes the PHY layers of a portion of the system. The D-CMTS 200 may include a D-CMTS 230 (e.g., core) that includes data 210 that is sent and received over the Internet (or other network) typically in the form of packetized data. The D-CMTS 200 may also receive downstream video 220, typically in the form of packetized data from an operator video aggregation system. The D-CMTS 230 receives and processes the received data 210 and downstream video 220. A remote Fiber node 280 preferably include a remote PHY device 290. The remote PHY device 290 may transmit downstream data 240 and downstream video 250 to a customer's cable modem and/or set top box 260 through a network, which may include other devices, such as amplifier and splitters. The remote PHY device 290 may receive upstream data 270 from a customer's cable modem and/or set top box 260 through a network, which may include other devices, such as amplifiers and splitters. The remote PHY device 290 may include multiple devices to achieve its desired capabilities. The remote PHY device 290 primarily includes PHY related circuitry, such as downstream QAM modulators, upstream QAM demodulators, together with pseudowire logic to connect to the D-CMTS 230 using network packetized data. The remote PHY device 290 and the D-CMTS 230 may include data and/or video interconnections, such as downstream data, downstream video, and upstream data 295. It is noted that, in some embodiments, video traffic may go directly to the remote physical device thereby bypassing the D-CMTS 230. In some cases, the remote PHY and/or remote MAC PHY functionality may be provided at the head end.

By way of example, the remote PHY device 290 may covert downstream DOCSIS (i.e., Data Over Cable Service Interface Specification) data (e.g., DOCSIS 1.0; 1.1; 2.0; 3.0; 3.1; and 4.0 (inclusive of additional versions) each of which are incorporated herein by reference in their entirety), video data, out of band signals received from the D-CMTS 230 to analog for transmission over RF or analog optics. By way of example, the remote PHY device 290 may convert upstream DOCSIS, and out of band signals received from an analog medium, such as RF or linear optics, to digital for transmission to the D-CMTS 230. As it may be observed, depending on the particular configuration, the R-PHY may move all or a portion of the DOCSIS MAC and/or PHY layers down to the fiber node.

Figure 3:
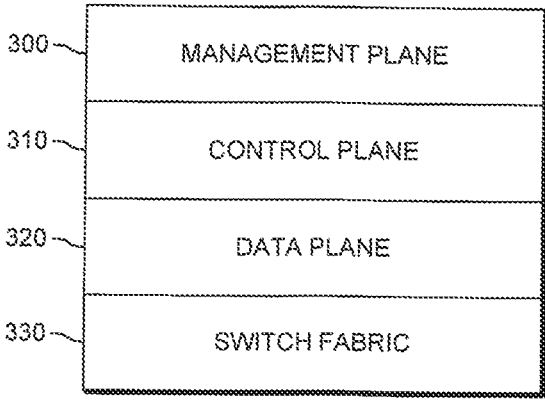
FIG. 3 illustrates a layered network processing stack.

Referring to FIG. 3, for data processing and for transferring data across a network, the architecture of the hardware and/or software may be configured in the form of a plurality of different planes, each of which performing a different set of functionality. In relevant part the layered architecture may include different planes such as a management plane 300, a control plane 310, a data plane 320, and switch fabric 330 to effectuate sending and receiving packets of data.

For example, the management plane 300 may be generally considered as the user interaction or otherwise the general software application being run. The management plane typically configures, monitors, and provides management, and configuration served to all layers of the network stack and other portions of the system.

For example, the control plane 310 is a component to a switching function that often includes system configuration, management, and exchange of routing table information and forwarding information. Typically, the exchange of routing table information is performed relatively infrequently. A route controller of the control plane 310 exchanges topology information with other switches and constructs a routing table based upon a routing protocol. The control plane may also create a forwarding table for a forwarding engine. In general, the control plane may be thought of as the layer that makes decisions about where traffic is sent. Since the control functions are not performed on each arriving individual packet, they tend not to have a strict speed constraint.

For example, the data plane 320 parses packet headers for switching, manages quality of service, filtering, medium access control, encapsulations, and/or queuing. As a general matter, the data plane carriers the data traffic, which may be substantial in the case of cable distribution networks. In general, the data plane may be thought of as the layer that primarily forwards traffic to the next hop along the path to the selected destination according to the control plane logic through the switch fabric. The data plane tends to have strict speed constraints since it is performing functions on each arriving individual packet.

For example, the switch fabric 330 provides a network topology to interconnect network nodes via one or more network switches.

All of the software drivers for each of the hardware devices needs to be selected and installed. Each version of the software drivers for each of the hardware devices tends to have different characteristics and may be incompatible with other software and/or hardware. Accordingly, while the installer may select a driver for each hardware device, there is a strong likelihood that the installer will not select all of the appropriate drivers for the particular software environment and/or other hardware devices that are going to be used in the environment. All of the various software programs, many of which are separately developed using different environments, needs to be selected and installed. Each version of the software programs tend to have different characteristics and may be incompatible with other software and/or hardware. Accordingly, while the installer may select a software program, there is a strong likelihood that the installer will not select all of the appropriate drivers for the particular software environment and/or other hardware devices that are going to be used in combination with the selected software programs. Also, the installer may tend to use incomplete file sets which further complicates the installation.

In addition, as the installer begins to install each of the software programs and the hardware drivers (a software program), they may tend to obtain each of them in a serial manner and install them in a serial manner as they are obtained. Unfortunately, often in the middle of the installation process, the installer is unable to locate a particular required software program and/or hardware driver, resulting in a failed install. Also, as a result of only completing part of the installation process, the entire collection of software programs and hardware drivers will not permit the remote physical device to operate, resulting in a substantial service outage for the customers.

Further, the destination may need to have particular files located at particular locations, and installations performed in a particular manner at a particular destination. In some cases, the file locations may not exist, or the installations cannot be performed for the particular destination, resulting in an installation failure. Also, in many cases there needs to exist particular pre-installed software and/or drivers at the destination, and the failure to have such pre-installed software and/or drivers will result in an installation failure.

Moreover, the order in which particular software programs and hardware drivers are installed tend to have dependencies, where a first one needs to be installed prior to a second one. If the order of installation is reversed, either one or both will not install properly or otherwise may not operate properly, resulting in a substantial service outage for the customers.

Figure 4:
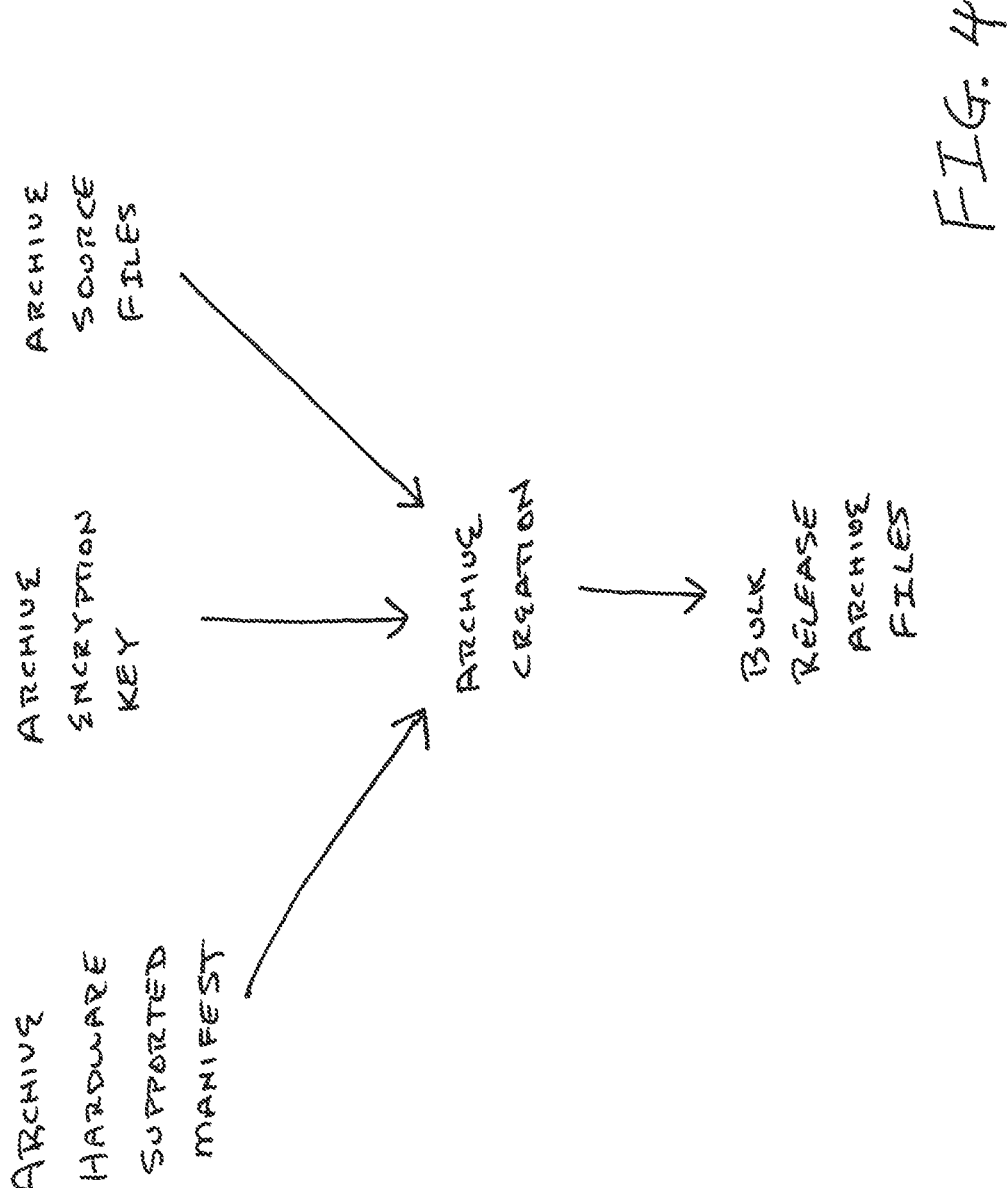
FIG. 4 illustrates a software archive creation process.

Referring to FIG. 4, it is desirable to use a packaging system for software delivery that generates an archive file with the software to be deployed for each version of the remote physical device 290, including variations in software capabilities and/or hardware capabilities and/or hardware variations. The packaging system is suitable to package the archive source files, an archive hardware supported manifest, an archive encryption key(s), and/or otherwise. The source files may be any type of software program, software driver, executable(s), data file(s), or otherwise that are suitable to be included in the form of a file, such as a .tar file, a .zip file, an executable, or otherwise. For example, the archive may include a distro registries. The distro registries may be distribution images, such as the underlying operating system (e.g., Red Hat, Ubuntu). For example, the archive may include web services (e.g., network based deliver service). The web services may be files, executables, installers, or otherwise that are available over a network, such as the Internet. For example, the archive file may be a .FIT file that includes a XEN kernel, a Linux kernel, a Linux device tree, a miccrosemi programming script, a 6×PL images, a root filesystem, a bootloader, and compat.dat. In this manner, the archive creation is capable of bringing together content from different technologies, from many different types of locations that have source content for the destination system, into a monolithic archive file.

The archive may include information maintained within the archive that indicates extraction dependencies between the different software applications and drivers. For example, the archive may indicate what drivers are to be installed on which hardware devices. For example, the archive may indicate where some of the software programs are to be installed. For example, the archive may indicate where some of the files are to be stored, such as in particular directories. For example, the archive may indicate where some of the files are to be obtained from, such as a web service.

The archive may include information related to the content maintained within the archive that indicates deployment dependencies between the different software applications and/or drivers. For example, the archive may indicate what drivers are to be installed on which hardware devices, and further possibly in what order. For example, the archive may indicate which software programs are to be installed in what order. By indicating the order for installation, at least to some degree, reduces the likelihood of one software program being dependent on another software program that failed to install. For example, the archive may indicate where some of the software programs and/or files are to be stored and/or installed, such as in particular directories. For example, the archive may indicate what other software programs, drivers, and/or files need to be already present at the designation in order for the archive to properly extract and/or deploy. In this manner, the extraction and/or deployment dependencies specify the characteristics of the destination environment and the order of installation (including deployment) of different aspects of the archive file.

As it may be observed, the archive ensures that the proper versions of software programs and software drivers are used, and that the software programs from disparate code basis, software drivers, and other files are located and installed in the appropriate locations, in some cases installed in a proper order, on an environment with suitable characteristics (e.g., directories, files, hardware, connectivity, installed software, installed drivers, etc.).

For increased compression efficiency, preferably each of the software programs and/or drivers and/or files are separately compressed into a corresponding compressed file (e.g., .tar, .zip). A public key may be used to encrypt each of the files into a compressed file. The collection of compressed files are then collectively compressed into a corresponding compressed file using the public key. The destination in a similar manner uses a private key to decompress the collection, then uses the private key to decompress each of the compressed files within the decompressed collection.

Figure 5:
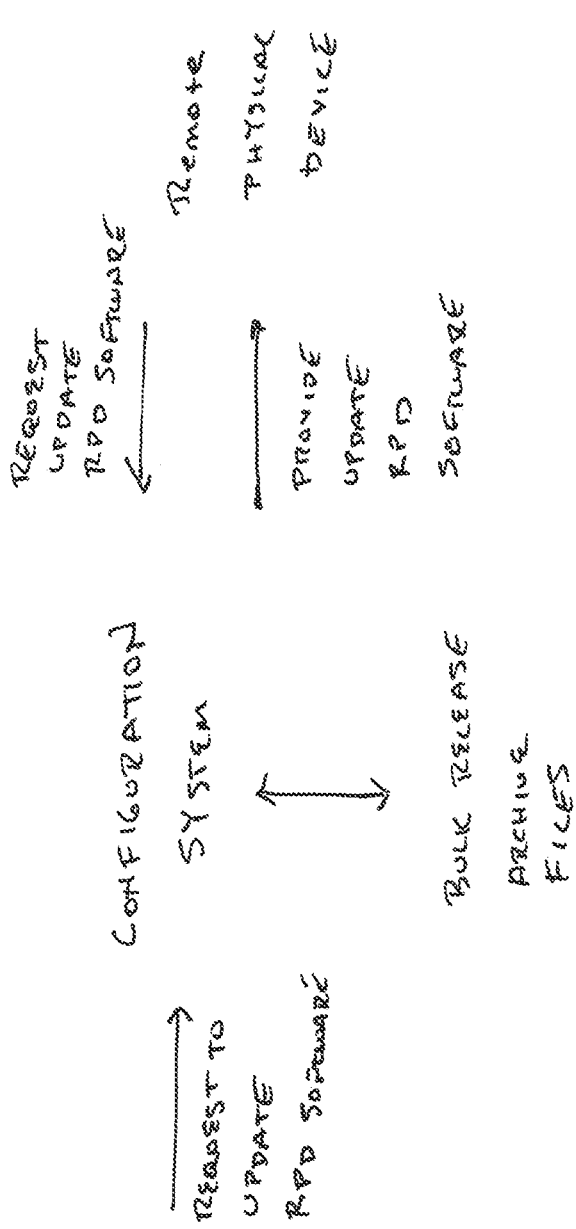
FIG. 5 illustrates an image file update technique for a remote physical device.

Referring to FIG. 5, a configuration system may receive an upgrade request for an image file from the remote physical device 290, or be provided with instructions provide an image file for upgrading the software for the remote physical device 290, or otherwise determine that it is desirable to provide an image file for changing the software for the remote physical device 290. The image file to be provided may include a version number or otherwise so that a desired version from the bulk release archive files may be selected. Depending on the image file to be provided and the currently installed software on the remote physical device 290, the image file may be considered an upgrade or a downgrade.

Over time, the hardware capabilities and hardware components of the remote physical device 290 tend to vary and/or the desired software functionality that is to be provided. In this manner, different versions of the image file may be incompatible with the particular remote physical device 290 or otherwise result in an operation that is incompatible with the particular network within which the remote physical device 290 is a part of. In most situations, it is desirable to update the remote physical device 290 with an updated image file having updated software capabilities. However, in some situations, it may be desirable to downgrade the remote physical device 290 with a previous image file having downgraded hardware and/or software capabilities. The downgrade typically occurs when there are operational errors in an updated image file or otherwise it is desirable to downgrade the image file to be consistent with other remote physical devices 290 included within the network.

Referring to FIG. 6, the remote physical device 290 may include or otherwise generate (e.g., scanning the hardware and/or software capabilities of the remote physical device) a hardware present manifest which is a hexadecimal value which is used as a bitfield where each bit represents a hardware component and/or feature. If a bit is set to one (or alternatively zero) then the hardware component and/or feature (or group of hardware components and/or features) is represented by that bit as being in effect for that manifest, and accordingly supported by the particular remote physical device 290. If a hardware component and/or feature is modified, the dynamically generated hardware present manifest may generate a different bitfield that represents the modified hardware component(s) and/or feature(s). In general, the bitmap having any desirable configuration may be used to represent the supported hardware component(s) and/or feature(s).

Referring to FIG. 7, the hardware supported manifest may be a hexadecimal value which is used as a bitfield where each bit represents a hardware component and/or feature that are supported by the archive file, e.g., image file. If a bit is set to one (or alternatively zero) then the hardware component and/or feature (or group of hardware components and/or features) is represented by that bit as being in effect for that manifest, and accordingly supported by the particular image file. If a hardware component and/or feature is modified, the corresponding hardware supported manifest may be modified with a different bitfield that represents the modified supported hardware component(s) and/or feature(s). In general, the bitmap having any desirable configuration may be used to represent the supported hardware component(s) and/or feature(s).

By way of example, the bits may be defined as follows:

| Bit | Hardware Component |
|---|---|
| 0 | NOR Flash - Micron |
| 1 | NOR Flash - ISSI |
| 2 | NOR Flash - Winbond |
| 3 | DC-DC Converter |
| 4 | Reserved |
| . . . | Reserved |
| 31 | Reserved |

For example, hardware supported manifest=0x7 indicates the remote physical device image file supports Micron, ISSI, and Winbond NOR Flash. For backward compatibility, once a bit is defined it remains unchanged for the life of the remote physical devices and future versions of the remote physical device.

Referring to FIG. 8, the remote physical device 290 may receive the selected image file, or otherwise the hardware supported manifest from the selected image file. The remote physical device then compares the hardware present manifest against the hardware supported manifest to determine what differences, if any, are present. For an image file to be compatible with a particular hardware and/or software revision the image file needs to support all of the hardware and/or software components or features present on the particular remote physical device, as defined by the hardware present manifest. If the image file does not include a hardware supported manifest, then the image file is denied from being used to modify the remote physical device. If the in-effect bits of the hardware present manifest are a subset of the in-effect bits of the hardware supported manifest then the upgrade is permitted to proceed, otherwise the upgrade is denied.

An exemplary image file compatibility check procedure may be as follows:

(1) Extract the hardware supported manifest from newly downloaded image file and read the hardware supported manifest. If the hardware supported manifest is not found in the image file, then the hardware supported manifest defaults to 0x1 (i.e. NOR Micron support only).

(2) Generate a bitfield that represents the current hardware and/or software present, the hardware present manifest. Read the ID, revision, and/or manufacturer from each hardware component supported by the compatibility checking system. When a hardware and/or software component is detected, its bit in the hardware present manifest is set.

(3) Compare the hardware supported manifest with the hardware present manifest. If all the bits set in the hardware present manifest are also set in the hardware supported manifest, then the upgrade is allowed to proceed.

(4) If there are bits set in the hardware present manifest that are not set in the hardware supported manifest then:

(a) the upgrade does not proceed;

(b) generate DOCSIS event ID 66070406;

(c) delete new image file from filesystem;

(d) selectively reboot the remote physical device.

If the new image is incompatible, then the remote physical device will reboot and load its existing committed image.

If the remote physical device contains enough information to set the hardware present manifest bitfield then the system may use it instead of reading the devices directly.

Each new hardware component that needs special software handling gets a bit defined in the compatibility bitfield and new code is written to determine if that hardware is present in the remote physical device.

Image compatibility checking is also performed when using the CLI 'reload' command to install a new unsigned image file.

Image file compatibility checking is performed before attempting to load the new image file. If an incompatible image file is loaded then it risks getting stuck in U-Boot if the new image's U-Boot is not compatible.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

We claim:

1. A remote physical device, comprising:

(a) said remote physical device capable of sending data to a cable modem termination system and receiving data from said cable modem termination system, and sending data to a customer premise device based upon a Data Over Cable Service Interface Specification protocol and receiving data from said customer premise device based upon said Data Over Cable Service Interface Specification protocol;

(b) said remote physical device having a present manifest representative of at least one of current hardware and software, where said present manifest is a bitfield;

(c) said remote physical device receiving a supported manifest representative of at least one of hardware and software supported by an image file, where said supported manifest is a bitfield;

(d) said remote physical device comparing said present manifest with said supported manifest to determine whether to install said image file on said remote physical device;

(e) wherein when said remote physical device installs said image file on said remote physical device when said comparing said physical manifest with said supported manifest indicates said image file is compatible with said remote physical device.

2. The remote physical device of claim 1 wherein said present manifest is generated by said remote physical device.

3. The remote physical device of claim 1 wherein each bit of said present manifest represents at least one of a hardware component and feature of said remote physical device.

4. The remote physical device of claim 1 wherein each bit of said supported manifest represents at least one of a hardware component and feature of said remote physical device.

5. The remote physical device of claim 3 wherein said present manifest is represented as a hexadecimal value.

6. The remote physical device of claim 4 wherein said supported manifest is represented as a hexadecimal value.

7. The remote physical device of claim 1 wherein each bit of said present manifest represents at least one of a hardware component and feature of said remote physical device; each bit of said supported manifest represents at least one of a hardware component and feature of said remote physical device; said supported manifest is represented as a hexadecimal value; and said present manifest is represented as a hexadecimal value.

8. The remote physical device of claim 1 wherein said comparing is based upon whether in-effect bits of said present manifest are a subset of in-effect bits of said supported manifest.

9. The remote physical device of claim 1 wherein when said remote physical devices determines not to install said image file on said remote physical device, said remote physical device generates a Data Over Cable Service Interface Specification (DOCSIS) event ID 66070406.

10. A remote physical device, comprising:

(a) said remote physical device capable of sending and receiving data from a cable modem termination system, and sending and receiving data from a customer premise device based upon a Data Over Cable Service Interface Specification protocol;

(b) said remote physical device having a present manifest representative of at least one of current hardware and software;

(c) said remote physical device receiving a supported manifest representative of at least one of hardware and software supported by an image file;

(d) said remote physical device comparing said present manifest with said supported manifest to determine whether to install said image file on said remote physical device;

(e) wherein when said remote physical device installs said image file on said remote physical device when said comparing said physical manifest with said supported manifest indicates said image file is compatible with said remote physical device.

* * * * *